(12) United States Patent
Bergel et al.

(10) Patent No.: US 8,543,063 B2
(45) Date of Patent: Sep. 24, 2013

(54) MULTI-POINT OPPORTUNISTIC BEAMFORMING WITH SELECTIVE BEAM ATTENUATION

(75) Inventors: Itsik Bergel, Givat Shmuel (IL); Shlomo Shamai, Tel Aviv (IL); Daniel Yellin, Ra'anana (IL); Yona Perets, Ra'anana (IL)

(73) Assignee: Marvell World Trade Ltd., St. Michael (BB)

( * ) Notice: Subject to any disclaimer, the term of this patent is extended or adjusted under 35 U.S.C. 154(b) by 81 days.

(21) Appl. No.: 12/723,647

(22) Filed: Mar. 14, 2010

(65) Prior Publication Data

US 2010/0267341 A1    Oct. 21, 2010

Related U.S. Application Data

(60) Provisional application No. 61/171,328, filed on Apr. 21, 2009.

(51) Int. Cl.
| | |
|---|---|
| H04B 1/00 | (2006.01) |
| H04B 15/00 | (2006.01) |
| H04B 7/00 | (2006.01) |
| H04B 17/00 | (2006.01) |
| H04B 1/04 | (2006.01) |
| H04B 1/18 | (2006.01) |
| H04B 1/06 | (2006.01) |
| H04B 1/10 | (2006.01) |
| H03C 1/62 | (2006.01) |

(52) U.S. Cl.
USPC .......... 455/63.1; 455/67.13; 455/68; 455/69; 455/500; 455/517; 455/114.2; 455/115.1; 455/161.2; 455/161.3; 455/226.2; 455/278.1; 455/296

(58) Field of Classification Search
USPC .......................................... 455/63.1, 69, 500
See application file for complete search history.

(56) References Cited

U.S. PATENT DOCUMENTS

| 5,231,629 A | 7/1993 | Kotzin et al. |
| 5,349,567 A | 9/1994 | Reed |

(Continued)

FOREIGN PATENT DOCUMENTS

| EP | 2182754 A1 | 5/2010 |
| JP | 2007-332580 | * 12/2007 |

(Continued)

OTHER PUBLICATIONS

3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.

(Continued)

*Primary Examiner* — Temesgh Ghebretinsae
*Assistant Examiner* — Devan Sandiford (57) ABSTRACT

A method for communication includes receiving at a receiver from a group of two or more transmitters multiple Radio Frequency (RF) transmission beams that alternate in time and space and include at least first and second transmission beams. The method identifies that the first transmission beam causes interference to reception of the second transmission beam. Feedback is sent from the receiver to one or more of the transmitters, so as to cause the transmitters to attenuate the first transmission beam during transmission of the second transmission beam.

18 Claims, 2 Drawing Sheets

(56) References Cited

U.S. PATENT DOCUMENTS

| | | | |
|---|---|---|---|
| 5,940,439 A | 8/1999 | Kleider et al. | |
| 6,466,904 B1 | 10/2002 | Gao et al. | |
| 6,512,750 B1 | 1/2003 | Palenius | |
| 6,757,319 B1 | 6/2004 | Parsa et al. | |
| 6,865,237 B1 | 3/2005 | Boariu et al. | |
| 7,839,944 B2 | 11/2010 | Lee et al. | |
| 7,941,186 B2 | 5/2011 | Cho et al. | |
| 8,036,286 B2 | 10/2011 | Lee et al. | |
| 8,068,555 B2 | 11/2011 | Jongren et al. | |
| 8,098,750 B2 | 1/2012 | Mueck et al. | |
| 8,179,775 B2 | 5/2012 | Chen et al. | |
| 2003/0035491 A1 | 2/2003 | Walton et al. | |
| 2005/0141630 A1 | 6/2005 | Catreaux et al. | |
| 2005/0157810 A1 | 7/2005 | Raleigh et al. | |
| 2005/0237920 A1 | 10/2005 | Howard et al. | |
| 2005/0250544 A1 | 11/2005 | Grant et al. | |
| 2006/0014554 A1* | 1/2006 | Gerlach | 455/501 |
| 2006/0056538 A1 | 3/2006 | Nam et al. | |
| 2006/0093060 A1 | 5/2006 | Jung et al. | |
| 2006/0114858 A1 | 6/2006 | Walton et al. | |
| 2006/0153112 A1 | 7/2006 | Lim et al. | |
| 2006/0203777 A1 | 9/2006 | Kim et al. | |
| 2006/0233131 A1* | 10/2006 | Gore et al. | 370/328 |
| 2006/0276212 A1 | 12/2006 | Sampath et al. | |
| 2007/0058746 A1 | 3/2007 | Gueguen | |
| 2007/0076810 A1 | 4/2007 | Herrera et al. | |
| 2007/0099578 A1 | 5/2007 | Adeney et al. | |
| 2007/0149229 A1 | 6/2007 | Frederiksen et al. | |
| 2007/0153731 A1 | 7/2007 | Fine | |
| 2007/0160162 A1 | 7/2007 | Kim et al. | |
| 2007/0165738 A1 | 7/2007 | Barriac et al. | |
| 2007/0223422 A1 | 9/2007 | Kim et al. | |
| 2007/0223423 A1 | 9/2007 | Kim et al. | |
| 2007/0230373 A1 | 10/2007 | Li et al. | |
| 2007/0253386 A1 | 11/2007 | Li et al. | |
| 2007/0270170 A1 | 11/2007 | Yoon et al. | |
| 2008/0013610 A1 | 1/2008 | Varadarajan et al. | |
| 2008/0025336 A1 | 1/2008 | Cho et al. | |
| 2008/0039067 A1 | 2/2008 | Jin et al. | |
| 2008/0080364 A1 | 4/2008 | Barak et al. | |
| 2008/0080632 A1 | 4/2008 | Kim et al. | |
| 2008/0080634 A1 | 4/2008 | Kotecha et al. | |
| 2008/0080635 A1 | 4/2008 | Hugl et al. | |
| 2008/0080637 A1 | 4/2008 | Khan et al. | |
| 2008/0095258 A1 | 4/2008 | She et al. | |
| 2008/0101407 A1 | 5/2008 | Khan et al. | |
| 2008/0108310 A1 | 5/2008 | Tong et al. | |
| 2008/0112351 A1 | 5/2008 | Surineni et al. | |
| 2008/0130778 A1 | 6/2008 | Xia et al. | |
| 2008/0165875 A1* | 7/2008 | Mundarath et al. | 375/262 |
| 2008/0192852 A1 | 8/2008 | Kent et al. | |
| 2008/0232494 A1 | 9/2008 | Pan et al. | |
| 2008/0232503 A1 | 9/2008 | Kim | |
| 2008/0247364 A1 | 10/2008 | Kim et al. | |
| 2008/0247475 A1 | 10/2008 | Kim et al. | |
| 2008/0268855 A1 | 10/2008 | Hanuni et al. | |
| 2008/0268887 A1 | 10/2008 | Jansen et al. | |
| 2008/0285433 A1 | 11/2008 | Akita et al. | |
| 2008/0292013 A1 | 11/2008 | Varadarajan et al. | |
| 2008/0298452 A1 | 12/2008 | Sampath et al. | |
| 2008/0298482 A1 | 12/2008 | Rensburg et al. | |
| 2008/0318606 A1 | 12/2008 | Tsutsui et al. | |
| 2009/0011761 A1 | 1/2009 | Han et al. | |
| 2009/0016263 A1* | 1/2009 | Kishigami et al. | 370/328 |
| 2009/0046800 A1 | 2/2009 | Xu et al. | |
| 2009/0098876 A1 | 4/2009 | Khan et al. | |
| 2009/0110114 A1 | 4/2009 | Onggosanusi et al. | |
| 2009/0122857 A1 | 5/2009 | Li et al. | |
| 2009/0161605 A1 | 6/2009 | Shen et al. | |
| 2009/0180561 A1 | 7/2009 | Kim et al. | |
| 2009/0252333 A1 | 10/2009 | Chang et al. | |
| 2009/0282310 A1 | 11/2009 | Seok et al. | |
| 2009/0296844 A1 | 12/2009 | Ihm et al. | |
| 2009/0304109 A1 | 12/2009 | Kotecha | |
| 2010/0031117 A1 | 2/2010 | Lee et al. | |
| 2010/0034308 A1 | 2/2010 | Kim et al. | |
| 2010/0035627 A1 | 2/2010 | Hou et al. | |
| 2010/0054354 A1 | 3/2010 | Tosato | |
| 2010/0056170 A1 | 3/2010 | Lindoff et al. | |
| 2010/0061477 A1 | 3/2010 | Lee et al. | |
| 2010/0067512 A1 | 3/2010 | Nam et al. | |
| 2010/0069106 A1 | 3/2010 | Swarts et al. | |
| 2010/0074301 A1 | 3/2010 | Howard et al. | |
| 2010/0103834 A1 | 4/2010 | Gorokhov et al. | |
| 2010/0158151 A1 | 6/2010 | Krauss et al. | |
| 2010/0172424 A1 | 7/2010 | Perets et al. | |
| 2010/0172430 A1 | 7/2010 | Melzer et al. | |
| 2010/0173639 A1* | 7/2010 | Li et al. | 455/450 |
| 2010/0215112 A1 | 8/2010 | Tsai et al. | |
| 2010/0220800 A1 | 9/2010 | Erell et al. | |
| 2010/0238984 A1 | 9/2010 | Sayana et al. | |
| 2010/0254474 A1 | 10/2010 | Gomadam et al. | |
| 2010/0260234 A1 | 10/2010 | Thomas et al. | |
| 2010/0260243 A1 | 10/2010 | Ihm et al. | |
| 2010/0271968 A1 | 10/2010 | Liu et al. | |
| 2010/0278278 A1 | 11/2010 | Lee et al. | |
| 2010/0284484 A1 | 11/2010 | Jongren et al. | |
| 2010/0290548 A1* | 11/2010 | Hoshino et al. | 375/260 |
| 2011/0019631 A1 | 1/2011 | Kotecha et al. | |
| 2011/0026413 A1 | 2/2011 | Swarts et al. | |
| 2011/0058621 A1 | 3/2011 | Clerckx et al. | |
| 2011/0064156 A1 | 3/2011 | Kim et al. | |
| 2011/0080969 A1 | 4/2011 | Jongren et al. | |
| 2011/0085610 A1 | 4/2011 | Zhuang et al. | |
| 2011/0103534 A1 | 5/2011 | Axmon et al. | |
| 2011/0110403 A1 | 5/2011 | Jongren | |
| 2011/0164701 A1 | 7/2011 | Nikopourdeilami et al. | |
| 2011/0194594 A1 | 8/2011 | Noh et al. | |
| 2011/0194644 A1 | 8/2011 | Liu et al. | |
| 2011/0205930 A1 | 8/2011 | Rahman et al. | |
| 2011/0250919 A1 | 10/2011 | Barbieri et al. | |
| 2011/0268204 A1 | 11/2011 | Choi et al. | |
| 2011/0306341 A1 | 12/2011 | Klein et al. | |
| 2012/0020433 A1 | 1/2012 | Bhattad et al. | |
| 2012/0033592 A1 | 2/2012 | Kim et al. | |
| 2012/0058735 A1 | 3/2012 | Vermani et al. | |
| 2012/0063336 A1 | 3/2012 | Shany et al. | |
| 2012/0069887 A1 | 3/2012 | Park et al. | |
| 2012/0069917 A1 | 3/2012 | Liu et al. | |
| 2012/0134434 A1 | 5/2012 | Chen et al. | |
| 2012/0219042 A1 | 8/2012 | Onggosanusi et al. | |
| 2012/0219083 A1 | 8/2012 | Tong et al. | |
| 2012/0257664 A1 | 10/2012 | Yue et al. | |
| 2012/0275376 A1 | 11/2012 | Sampath et al. | |
| 2012/0281620 A1 | 11/2012 | Sampath et al. | |
| 2013/0028068 A1 | 1/2013 | Park et al. | |
| 2013/0028344 A1 | 1/2013 | Chen et al. | |
| 2013/0039284 A1 | 2/2013 | Marinier et al. | |
| 2013/0051256 A1 | 2/2013 | Ong et al. | |
| 2013/0107916 A1 | 5/2013 | Liu et al. | |

FOREIGN PATENT DOCUMENTS

| | | |
|---|---|---|
| JP | 2008147792 A | 6/2008 |
| WO | 2007133564 A3 | 11/2007 |
| WO | 2008009157 A1 | 1/2008 |
| WO | 2008133582 A2 | 11/2008 |
| WO | 2010013950 A2 | 2/2010 |
| WO | 2011147692 A1 | 12/2011 |

OTHER PUBLICATIONS

Motorola, "Uplink Power Control for E-UTRA", 3GPP TSG RAN1 #48, St. Louis, USA, Feb. 12-16, 2007.

Nortel, "On the discussions of carrier aggregations", 3GPP TSG-RAN Working Group 1 Meeting #55, Prague, Czech Republic, Nov. 10-14, 2008.

NTT DOCOMO, Inc., "Updated Views on Support of Wider Bandwidth in LTE-Advanced", 3GPP TSG RAN WG1 Meeting #54bis, Prague, Czech Republic, Sep. 29-Oct. 3, 2008.

3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.

Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG-RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov. 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.
Samsung, "Discussion on Enhanced DL Beamforming", 3GPP TSG RAN WG1 Meeting #56bis, Seoul, Korea, Mar. 23-27, 2009.
Alcatel-Lucent Shanghai Bell, "Correlation-based Explicit Feedback", 3GPP TSG RAN WG1 Meeting # 59bis, Valencia, Spain, Jan. 18-22, 2010.
U.S. Appl. No. 12/983,898, filed Jan. 4, 2011.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov. 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
U.S. Appl. No. 13/023,555, filed Feb. 9, 2011.
U.S. Appl. No. 13/052,075, filed Mar. 20, 2011.
U.S. Appl. No. 61/321,386, filed Apr. 6, 2010.
U.S. Appl. No. 12/838,509, filed Jul. 19, 2010.
U.S. Appl. No. 61/294,737, filed Mar. 13, 2010.
U.S. Appl. No. 12/965,878, filed Dec. 12, 2010.
U.S. Appl. No. 12/902,168, filed Oct. 12, 2010.
U.S. Appl. No. 12/903,237, filed Oct. 13, 2010.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Marvell, "Codebook Adaptation for ULA Antenna", 3GPP TSG RAN WG1 Meeting #60, San Francisco, USA, Feb. 22-22, 2010.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009 (R1-092395).
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT DOCOMO), "Text Proposal for RAN1 TR on LTE Advanced", 3GPP TSG RAN WG1 Meeting #53bis, Warsaw, Poland, Jun. 30-Jul. 4, 2008.
Lee W. Young; Written Opinion of the International Searching Authority; Patent Cooperation Treaty; Sep. 21, 2010; International application No. PCT/IB 10/51088.
Lee W. Young; Written Opinion of the International Searching Authority; Patent Cooperation Treaty; Jan. 28, 2010; International application No. PCT/IB 09/52726.
Lee W. Young; Written Opinion of the International Searching Authority; Patent Cooperation Treaty; Jul. 15, 2010; International application No. PCT/IB 10/50797.
Lee W. Young; Written Opinion of the International Searching Authority; Patent Cooperation Treaty; Jun. 15, 2010; International application No. PCT/IB 10/50014.
Lee W. Young; Written Opinion of the International Searching Authority; Patent Cooperation Treaty; Jul. 9, 2010; International application No. PCT/IB 10/51089.
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
Ericsson, "Design and Evaluation of Precoder Codebooks for CSI Feedback", 3GPP TSG RAN WG1 61bis, Dresden, Germany, Jun. 28-Jul. 2, 2010.
Rapporteur, "Coordinated Multi-Point Operation for LTE", TSG RAN WG1 50, Istanbul, Turkey, Dec. 7-10, 2010.
Alcatel-Lucent et al., "Way Forward on CSI Feedback for Rel.10 DL MIMO", 3GPP TSG RAN WG1 62, Madrid, Aug. 23-27, 2010.
Alcatel-Lucent et al., "Way Forward on 8Tx Codebook for Rel.10 DL MIMO", 3GPP TSG RAN WG1 62, Madrid, Spain, Aug. 23-27, 2010.
U.S. Appl. No. 61/390,423, filed Oct. 6, 2010.
U.S. Appl. No. 61/432,980, filed Jan. 14, 2011.
U.S. Appl. No. 61/390,511, filed Oct. 6, 2010.
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009 (R1-090235).
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008 (R1-084321).
Samsung, "UL Transmission Power Control in LTE-A", 3GPP TSG RAN WG1 Meeting #56bis, Seoul, Korea, Mar. 23-27, 2009 (R1-091250).
Nokia Siemens Networks, "Autonomous Component Carrier Selection for LTE Advanced", 3GPP TSG RAN WG1 Meeting #54, Jeju Island, Korea, Aug. 18-22, 2008 (R1-083103).
Ericsson, "Carrier Aggregation in LTE-Advanced", TSG-RAN WG1 #53bis, Warsaw, Poland, Jun. 30-Jul. 4, 2008.
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Pusch Power Control for LTE-Advanced", 3GPP TSG RAN WG1 Meeting # 57bis,Los Angeles, USA, Jun. 29-Jul. 3, 2009 (R1-092574).

Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4×2 and 4×4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009 (R1-091773).
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16-2001, IEEE Computer Society and IEE Microwave Theory and Techniques Society, USA, Oct. 1, 2004.
NTT Docomo et al., "Prioritized Deployment Scenarios for LTE-Advanced Studies", 3GPP TSG RAN WG4 Meeting #50, Athens, Greece, Feb. 9-13, 2009 (R4-091011).
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8×8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
3rd Generation Partnership Project; "Technical Specification Group Radio Access Network; Evolved Universal Terrestrial Radio Access (E-UTRA)"; Physical Layer Procedures (Release 8), 3GPP TS 36.213 V8.6.0 (Mar. 2009), Sophia Antipolis, France.
Qualcomm Europe, Notion of Anchor Carrier in LTE-A, 3GPP TSG RAN WG1 Meeting #55-bis, Ljubljana, Slovenia, Jan. 12-16, 2009 (R1-080356).
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009 (R1-092415).
3GPP Technical Specification 36.211 "Technical Specification Group Radio Access Network; Evolved Universal Terrestrial Radio Access (E-UTRA); Physical Channels and Modulation (Release 8)," version 8.6.0, Sophia Antipolis, France, Mar. 2009.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
U.S. Appl. No. 12/965,878 Official Action dated Apr. 1, 2013.
U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
U.S. Appl. No. 12/477,152 Official Action dated Jun. 26, 2012.
U.S. Appl. No. 12/723,645 Official Action dated Aug. 31, 2012.
International Application PCT/IB2012/051511 Search Report dated Aug. 31, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subspace-Based Channel Quantization for Distributed Cooperative Antenna Systems with Temporarily Correlated Channels", EURASIP Journal on Advances in Signal Processing, vol. 2008, Nov. 23, 2007.
NTT Docomo, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
JP Patent Application # 2011-544111 Official Action dated Nov. 6, 2012.
U.S. Appl. No. 12/652,044 Official Action dated Feb. 7, 2012.
Japanese Patent Application # 2011-544111 Office Action dated Mar. 12, 2013.
U.S. Appl. No. 13/252,218 Office Action dated Apr. 11, 2013.
ZTE, "Link Analysis of 4Tx Codebook Design for DL SU-MIMO", 3GPP TSG-RAN WG1 #48bis, St. Julians, Malta, Mar. 26-30, 2007.

Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/253,078 Office Action dated May 23, 2013.
U.S. Appl. No. 12/902,168 Office Action dated Aug. 5, 2013.
U.S. Appl. No. 13/760,088 Office Action dated Aug. 2, 2013.
U.S. Appl. No. 13/052,075 Office Action dated Jul. 15, 2013.
U.S. Appl. No. 13/766,790 Office Action dated Jul. 22, 2013.

* cited by examiner

MULTI-POINT OPPORTUNISTIC BEAMFORMING WITH SELECTIVE BEAM ATTENUATION

CROSS-REFERENCE TO RELATED APPLICATIONS

This application claims the benefit of U.S. Provisional Patent Application 61/171,328, filed Apr. 21, 2009, whose disclosure is incorporated herein by reference.

FIELD OF THE DISCLOSURE

The present invention relates generally to communication systems, and particularly to methods and systems for communication using multiple antennas.

BACKGROUND

Some communication systems transmit data from a transmitter to a receiver over multiple communication channels, using multiple transmit antennas and multiple receive antennas. Multiple-channel transmission is used, for example, in spatial multiplexing schemes that achieve high throughput, in beam-forming schemes that achieve high antenna directivity and in spatial diversity schemes that achieve high resilience against channel fading and multipath. These schemes are often referred to collectively as Multiple-Input Multiple-Output (MIMO) schemes.

MIMO schemes are contemplated, for example, for use in Evolved Universal Terrestrial Radio Access (E-UTRA) systems, also referred to as Long Term Evolution (LTE) systems. The Third Generation Partnership Project (3GPP) E-UTRA standards specify MIMO schemes for use by E-UTRA User Equipment (UE) and base stations (eNodeB's). These schemes are described, for example, in 3GPP Technical Specification 36.211, entitled "Technical Specification Group Radio Access Network; Evolved Universal Terrestrial Radio Access (E-UTRA); Physical Channels and Modulation (Release 8)," (3GPP TS 36.211), version 8.6.0, March, 2009, which is incorporated herein by reference. The 3GPP is currently in the process of specifying an extension of the E-UTRA specification, which is referred to as LTE-Advanced (LTE-A).

Opportunistic beam-forming is a communication technique in which a transmitter transmits a pattern of directional transmission beams that alternates over time. The transmitter determines a suitable scheduling for transmitting to a particular receiver, for example the optimal scheduling, based on feedback from the receiver. Opportunistic beam-forming schemes are described, for example, by Viswanath et al., in "Opportunistic Beamforming Using Dumb Antennas," IEEE Transactions on Information Theory, volume 48, No. 6, June, 2002, pages 1277-1294, and by Sharif and Hassibi, in "On the Capacity of MIMO Broadcast Channels with Partial Side Information," IEEE Transactions on Information Theory, volume 51, No. 2, February, 2005, pages 506-522, which are incorporated herein by reference.

The description above is presented as a general overview of related art in this field and should not be construed as an admission that any of the information it contains constitutes prior art against the present patent application.

SUMMARY

An embodiment that is described herein provides a method for communication. The method includes receiving at a receiver from a group of two or more transmitters multiple Radio Frequency (RF) transmission beams that alternate in time and space and include at least first and second transmission beams. The method identifies that the first transmission beam causes interference to reception of the second transmission beam. Feedback is sent from the receiver to one or more of the transmitters, so as to cause the transmitters to attenuate the first transmission beam during transmission of the second transmission beam.

In some embodiments, the first and second transmission beams alternate in time and space in accordance with a pattern that is coordinated among the transmitters. In an embodiment, the first transmission beam is identified as causing the interference after identifying the second transmission beam as being preferable for receiving subsequent transmissions to the receiver. In a disclosed embodiment, the method includes identifying the second transmission beam as being preferable for receiving subsequent transmissions to the receiver, and sending the feedback includes sending a request to receive the subsequent transmissions over the second transmission beam.

In some embodiments, identifying that the first transmission beam causes the interference includes measuring signal quality on at least some of the received transmission beams, and detecting the interference responsively to the measured signal quality. In an embodiment, measuring the signal quality includes receiving pilot signals on the at least some received transmission beams, and measuring the signal quality over the pilot signals.

In an embodiment, identifying that the first transmission beam causes the interference includes predicting the interference for a future occurrence of the first and second transmission beams, and sending the feedback includes causing the transmitters to attenuate the first transmission beam during the future occurrence. In a disclosed embodiment, the method includes selecting a preferred time interval for receiving the signals on the second transmission beam, and sending the feedback includes causing the transmitters to attenuate the first transmission beam during the preferred time interval.

In an embodiment, receiving the transmission beams includes receiving signals conforming to a Long Term Evolution (LTE) specification. In another embodiment, receiving the transmission beams includes receiving at least one transmission beam that is transmitted jointly by two or more of the transmitters. In yet another embodiment, sending the feedback includes causing the transmitters to transmit data to at least one other receiver over the attenuated first transmission beam.

There is additionally provided, in accordance with an embodiment that is described herein, a communication apparatus including a receiver and a processor. The receiver is configured to receive from a group of two or more transmitters multiple Radio Frequency (RF) transmission beams that alternate in time and space and include at least first and second transmission beams. The processor is configured to identify that the first transmission beam causes interference to reception of the second transmission beam, and to cause sending of feedback to one or more of the transmitters, so as to cause the transmitters to attenuate the first transmission beam during transmission of the second transmission beam. In an embodiment, a mobile communication terminal includes the disclosed communication apparatus. In an embodiment, a chipset for processing signals in a mobile communication terminal includes the disclosed communication apparatus.

There is also provided, in accordance with an embodiment that is described herein, method for communication. The method includes transmitting to a receiver from two or more transmitters multiple transmission beams that alternate in time and space and include at least first and second transmission beams. Feedback from the receiver is received at the transmitters. The feedback indicates that the first transmission beam causes interference to reception of the second transmission beam. Responsively to the feedback, the first transmission beam is attenuated during transmission of the second transmission beam.

There is further provided, in accordance with an embodiment that is described herein, a communication system including two or more transmitters. The transmitters are configured to transmit to a receiver multiple transmission beams that alternate in time and space and include at least first and second transmission beams, to receive from the receiver feedback indicating that the first transmission beam causes interference to reception of the second transmission beam, and, responsively to the feedback, to attenuate the first transmission beam during transmission of the second transmission beam.

The present disclosure will be more fully understood from the following detailed description of the embodiments thereof, taken together with the drawings in which:

DETAILED DESCRIPTION OF EMBODIMENTS

Embodiments that are described hereinbelow provide improved methods and systems for opportunistic beam-forming. In some embodiments, a communication system comprises two or more transmitters that transmit to a plurality of receivers. The transmitters transmit multiple directional Radio frequency (RF) transmission beams, which alternate in time and space. In some embodiments, the transmission beams alternate in accordance with a pattern that is coordinated among the transmitters.

In some embodiments, each receiver receives the transmission beams and measures signal quality on the received transmission beams. Based on the signal quality measurements, the receiver identifies one or more preferred transmission beams over which it prefers to receive data, and one or more interfering beams that cause interference to the preferred beams. Typically although not necessarily, the receiver first identifies a preferred beam, and then identifies one or more beams that cause interference to the preferred beam.

The receiver transmits feedback to the transmitters, which indicates the preferred and interfering beams. In an embodiment, the receiver transmits a request to attenuate the one or more interfering beams. Alternatively, the receiver reports the signal quality measurements as feedback, so as to enable the transmitters to select over which beam to transmit and which beam to attenuate.

In some embodiments, the transmitters take various actions and apply various policies in response to the feedback received from the receivers. In an embodiment, the transmitters select over which beam or beams to transmit to a given receiver. As another example, based on received feedback, the transmitters decide to attenuate one or more of the interfering beams while transmitting one or more of the preferred beams. As yet another example, the transmitters select a preferred time at which to transmit to a given receiver over a certain preferred beam. Various other transmitter decisions and decision criteria are described herein.

Unlike some opportunistic beam-forming schemes, in accordance with an embodiment of the disclosure, the transmitters proactively attenuate transmission beams that cause interference based on feedback relating to one or more received signals and/or specific requests from the receiver to attenuate one or more of the downlink signals. As a result, the disclosed techniques provide high signal quality, high throughput and small latency. The disclosed techniques are suitable for communication systems whose performance is limited by interference, such as some cellular networks. Performance gains achieved by embodiments of the present disclosure are achieved with a relatively small increase in communication overhead and system complexity.

Figure 1:
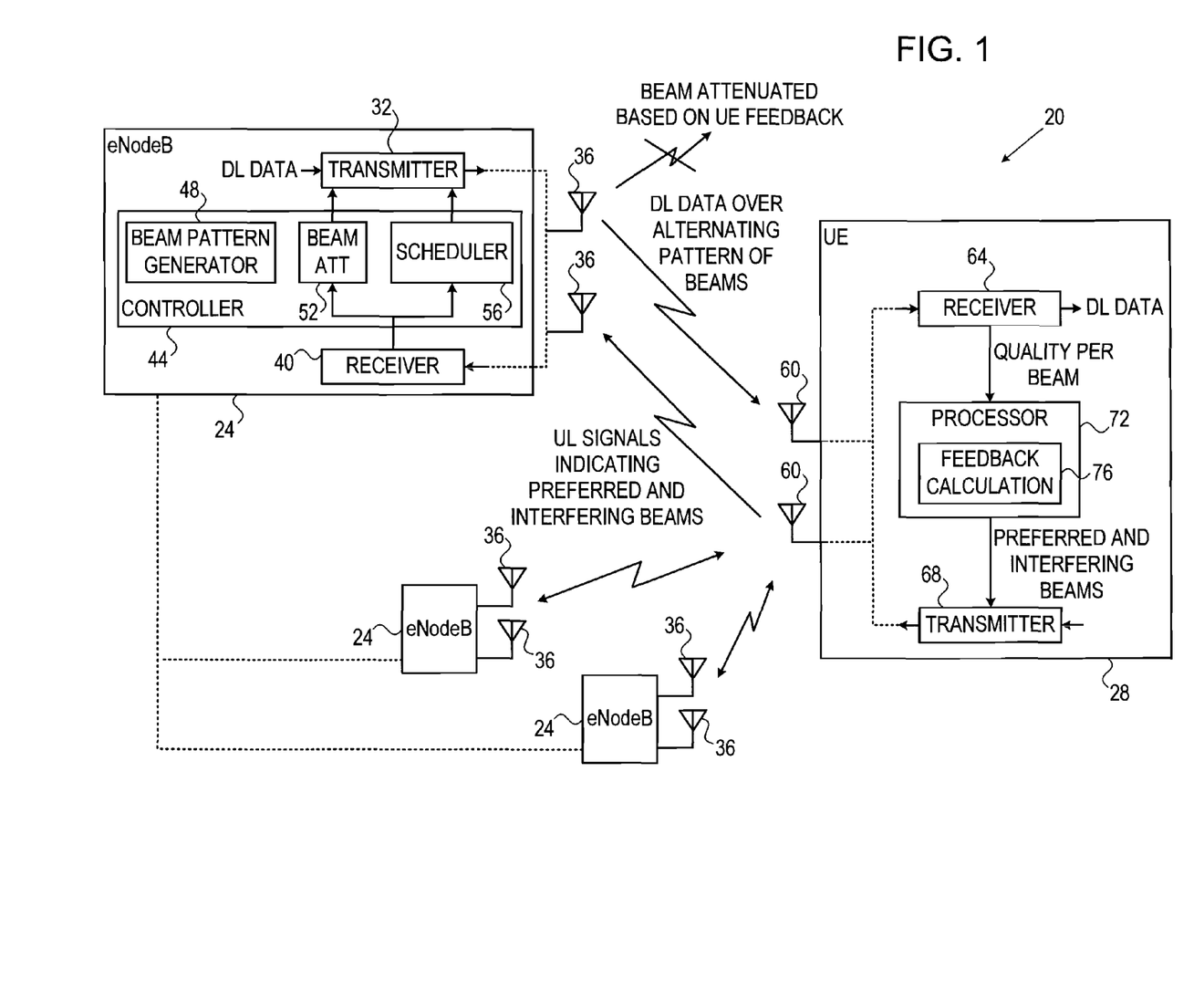
FIG. 1 is a block diagram that schematically illustrates a communication system that employs opportunistic beam-forming with selective beam attenuation, in accordance with an embodiment of the present disclosure.

FIG. 1 is a block diagram that schematically illustrates a wireless communication system 20 that employs opportunistic beam-forming with selective beam attenuation, in accordance with an embodiment of the present disclosure. System 20 operates in accordance with any suitable communication standard or protocol. In the present example, system 20 operates in accordance with the LTE or LTE-A specifications, cited above. Alternatively, the techniques described herein can be used in systems operating in accordance with any other suitable communication standard or protocol, such as IEEE 802.16 (also referred to as WiMAX), Wideband Code Division Multiplexing (WCDMA) and Global System for Mobile communications (GSM), for example.

System 20 comprises multiple transmitters, which transmit signals to multiple receivers. In the present example, the transmitters are embodied in LTE or LTE-A base stations (eNodeB's) 24, and the receivers comprise LTE or LTE-A compliant mobile terminals (UE's) 28. Although FIG. 1 shows three eNodeB's and a single UE for the sake of clarity, real-life systems typically comprise a large number of eNodeB's and UE's. Although the embodiments are described herein in the context of downlink transmissions from the eNodeB's to the UE's, in some communication systems the disclosed techniques are suitably adapted to the uplink.

Each eNodeB 24 comprises a downlink transmitter 32, which transmits downlink signals to UE's 28 via one or more antennas 36. (In FIG. 1, the internal eNodeB structure is shown in detail for only one of the eNodeB's, for the sake of clarity. The other eNodeB's in the system typically have a similar structure.) At any given time, the eNodeB's 24 in system 20 transmit M downlink Radio Frequency (RF) transmission beams, which convey respective downlink signals that carry data to UE's 28. The transmission beams (referred to herein as beams for brevity) are typically directional.

In an embodiment, a directional transmission beam is produced by a single eNodeB using two or more antennas 36. Alternatively, a directional beam is produced by multiple eNodeB's that transmit the same signal simultaneously, in which case each eNodeB uses one or more antennas 36. The group of eNodeB's producing a given beam is referred to herein as a cluster. In the description that follows, each beam is regarded as being transmitted by a cluster of eNodeB's. When a beam is transmitted by a single eNodeB, the cluster is regarded as containing only the single eNodeB.

Each transmission beam thus comprises a directional RF signal that carries data. Each beam is generated by transmitting the same data-carrying signal from a set of antennas 36, which belong to one or more eNodeB's, while applying respective multiplicative weights to the antennas in the set. In an embodiment, the direction in which a beam is transmitted is modified by modifying the weights applied to the antennas. This action is referred to as beam steering.

The beam steering applied to the $i^{th}$ beam (i.e., the weights applied to the different antennas that participate in transmission of the $i^{th}$ beam) is represented by a weight vector denoted $\underline{w}_i$. If the cluster of eNodeB's that generate the $i^{th}$ beam is denoted $B_i$, and the number of antennas in the $k^{th}$ eNodeB in this cluster is denoted $N_k$, then vector $\underline{w}_i$ has $\Sigma_{k \in B_i} N_k$ elements.

Each element of $\underline{w}_i$ is a multiplicative weight (typically a complex number having a magnitude and phase) that is applied to the signal transmitted via the respective antenna 36. In some embodiments, the weight vectors in a given cluster are orthogonal to one another, i.e., $\underline{w}_i^H \underline{w}_j = 0$ if $B_i = B_j (i \neq j)$.

The set of M beams, which are transmitted by system 20 at a given time, is referred to herein as a beam setting. In some embodiments, system 20 modifies the beam setting at periodic time intervals. In other words, eNodeB's 24 transmit multiple transmission beams, which alternate over time and space. In LTE or LTE-A systems, for example, the beam setting can be modified every Transmission Time Interval (TTI), every several TTIs, or at any other suitable period.

In some embodiments, the eNodeB's alternate the beams in time and space according to a pattern that is coordinated among the eNodeB's. In alternative embodiments, each eNodeB alternates the beams without coordination with other eNodeBs. Further alternatively, the eNodeB's may not use any sort of pattern. Typically, however, the eNodeB's synchronize the OFDM symbol timing with one another.

As will be explained below, in some embodiments the pattern of beam settings is predefined, whereas in other embodiments the pattern is pseudo-random. When using a periodic pattern, each eNodeB may change its local beam settings (i.e., the weight vector elements corresponding to its own antennas 36) in a certain cycle period, which may be the same as or different from the cycle periods of other eNodeB's. Typically, the beam settings are chosen to be sufficiently diverse, so that each UE is likely to encounter beam settings that provide high signal strength and low interference. In some embodiments, a cluster of eNodeB's generates and alternates the beams using an optimization process. The optimization process is often unknown to the UEs.

When preparing to transmit data to a given UE 28, in an embodiment system 20 selects over which beam and at what time to transmit the data. Moreover, in some embodiments system 20 decides to attenuate one or more of the beams so as to reduce interference to another beam. In accordance with an embodiment of the disclosure, these scheduling and attenuation decisions are based on feedback that is provided by the UE's, using methods that are described in detail herein.

Each eNodeB 24 comprises an uplink receiver 40, which receives uplink signals from the UE's (either via antennas 36 or via separate receive antennas, not shown in the figure). In particular, receiver 40 receives from the UE's feedback, which enables the eNodeB's to make scheduling and beam attenuation decisions. In some embodiments, the feedback comprises an explicit request from the UE to receive transmissions over one or more beams and/or to attenuate one or more beams. Alternatively, the feedback comprises signal quality measures, as measured by the UE on one or more of the received beams. Using this information, the eNodeB's decide over which beams to transmit and which beams to attenuate.

Each eNodeB 24 further comprises a controller 44, which manages the operation of the eNodeB. Controller 44 comprises a beam pattern generator 48, which generates the pattern of beam settings to be transmitted from transmitter 32. In an embodiment, the beam pattern generators 48 of the different eNodeB's 24 coordinate and synchronize the pattern generation with one another.

In some embodiments, controller 44 comprises a beam attenuation module 52, which configures transmitter 32 to attenuate one or more of the transmitted beams. The beams to be attenuated are selected based on the feedback received from UE's 28. Controller 44 further comprises a scheduler 56, which schedules data for transmission over the different beams. In particular, scheduler 56 decides over which beam to transmit data to each UE, and at what time (e.g., during which TTI). In some embodiments, controller 44 (e.g., using scheduler 56) selects the appropriate modulation and error correction coding scheme to be used for transmitting to each UE.

Each UE 28 receives the downlink transmission beams using one or more antennas 60. A downlink receiver 64 receives and decodes the signals transmitted over the different beams, so as to reconstruct and output the downlink data. In addition, receiver 64 measures the signal quality on each beam. In an embodiment, receiver 64 measures, for example, the Signal to Noise Ratio (SNR) on each beam, or any other suitable signal quality measure.

As seen in FIG. 1, in an embodiment UE 28 comprises a processor 72, which manages and controls the operation of the UE. In some embodiments, processor 72 comprises a feedback calculation module 76, which determines the feedback to be transmitted from the UE to the eNodeB's. In an example embodiment, Module 76 determines the feedback based on the signal quality measurements performed by downlink receiver 64 on the different beams. In some embodiments, the feedback indicates (1) one or more beams that the UE regard as preferable for receiving downlink transmissions, (2) one or more beams that cause interference to downlink reception at the UE, and/or (3) a specific request to attenuate one or more of the transmitted beams.

This sort of feedback enables the eNodeB's to schedule downlink data over the preferred beams, and to attenuate interfering beams. Several examples of selection criteria and feedback schemes are described further below. UE 28 comprises an uplink transmitter 68, which transmits uplink signals to the eNodeB's. In particular, the uplink transmitter transmits the feedback produced by module 76.

The system configuration shown in FIG. 1 is a simplified example configuration, which is depicted for the sake of conceptual clarity. In alternative embodiments, any other suitable system configuration can also be used. In an embodiment, the different components of eNodeB's 24 and UE's 28 are implemented using dedicated hardware, such as using one or more Application-Specific Integrated Circuits (ASICs) and/or Field-Programmable Gate Arrays (FPGAs). Alternatively, in an embodiment, some eNodeB and UE components are implemented using software running on general-purpose hardware, firmware, or using a combination of hardware and software elements.

In some embodiments, controller 44 and processor 72 comprise general-purpose processors, which are programmed in software to carry out computer instructions to provide the functions described herein, although they too may be implemented on dedicated hardware. The software instructions may be downloaded to the processors in electronic form, over a network, for example. Alternatively or additionally, the software instructions are provided and/or stored on tangible media, such as magnetic, optical, or electronic memory. In some embodiments, some or all of the elements of UE 28, and/or some or all of the elements of eNodeB 24, are fabricated in a chip-set. UE and eNodeB elements that are not mandatory for explanation of the disclosed techniques, such as various Radio Frequency (RF) elements, have been omitted from FIG. 1 for the sake of clarity.

Figure 2:
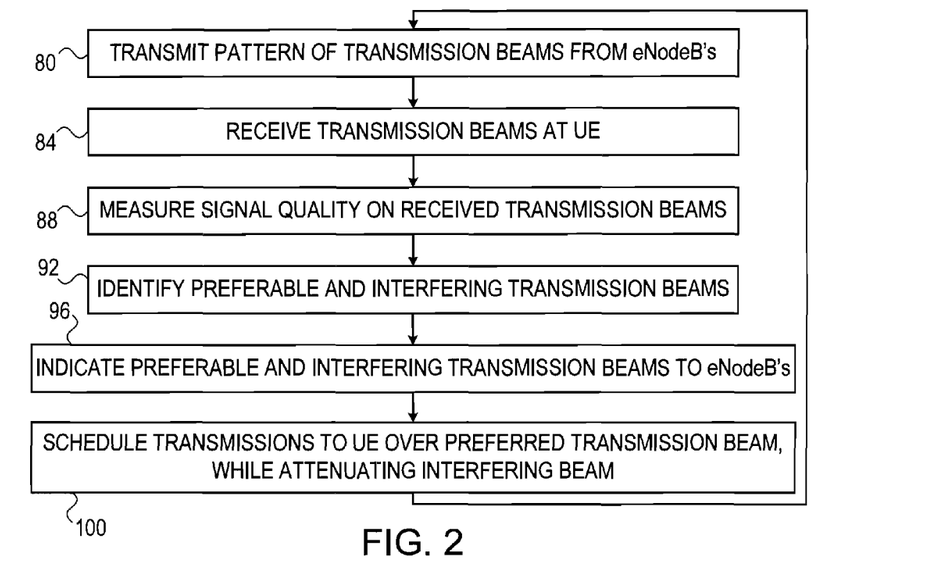
FIG. 2 is a flow chart that schematically illustrates a method for communication using opportunistic beam-forming with selective beam attenuation, in accordance with an embodiment of the present disclosure.

FIG. 2 is a flow chart that schematically illustrates a method for communication using opportunistic beam-forming with selective beam attenuation, in accordance with an embodiment of the present disclosure. The method begins at a beam transmission operation 80, with eNodeB's 24 transmitting a pattern of RF transmission beams. At a beam reception operation 84, UE 28 receives at least some of the beams using downlink receiver 64. At a quality reception operation 88, receiver 64 measures the signal quality on each of the received beams. Receiver 64 reports the signal quality measures of the different beams to processor 72.

At a beam identification operation 92, processor 72 identifies one or more preferable beams and/or one or more interfering beams, based on the signal quality measurements. At a feedback operation 96, uplink transmitter 68 transmits the feedback indicative of the preferred and interfering beams to the eNodeB's. At a scheduling and attenuation operation 100, eNodeB's 24 schedule subsequent transmissions to the UE based on the received feedback. In addition, the eNodeB's select and attenuate one or more of the beams based on the UE feedback. Note that the eNodeB's in a given cluster typically cooperate in making scheduling decisions, regardless of whether they coordinate the pattern of beam settings with one another.

UE's 28 suitably calculate and report the feedback in various ways. For example, in an embodiment the UE calculates the SNR on each beam, assuming all the other beams are active (and therefore potentially cause interference). In addition, in an embodiment the UE calculates the SNR on each beam, assuming that one or more of the worst-interfering beams are turned off. In some embodiments, each UE is pre-allocated a set of beams, referred to as the serving beams of the UE. The serving beams of a given UE may be generated by a single eNodeB, by a cluster of eNodeB's, or by multiple clusters. In an embodiment, the UE measures signal quality and calculates the feedback while considering only its pre-allocated serving beams (i.e., disregards potential interference from beams other than the serving beams).

In an example embodiment, the UE indicates the most desirable beams in the feedback by reporting the m strongest beams, m≧1. In some embodiments, the UE reports the SNR measured on these beams, as well. In some embodiments, the UE identifies v≧1 preferable transmission times over the preferable beams. In an embodiment, The UE reports the preferable transmission times in the feedback, possibly together with the achievable SNR at these transmission times.

In some embodiments, the UE identifies one or more beams that cause considerable interference to the reception of the preferable beams. For example, in an embodiment the UE identifies one or more beams, whose attenuation (e.g., silencing) would cause the highest improvement in SNR over the preferable beams. In an example embodiment, the UE reports the u≧1 beams that cause the strongest interference. In another example embodiment UE also reports the SNR improvement that is expected to result from attenuating the interfering beams. As another example, the UE reports all interfering beams, whose attenuation would improve the SNR over some preferred beam by at least ΔdB.

In some embodiments, a group of two or more beams is addressed to a given UE, and the UE comprises a mechanism for canceling the interference between different beams in the group (e.g., by decoding the signals of the different beams and subtracting one signal from another). In these embodiments, the UE disregards interference between beams within the group when identifying the preferable and interfering beams, assuming it will be able to cancel this interference internally. Additionally or alternatively, the UE may identify and report the preferable and interfering beams in any other suitable way.

Receiver 64 in the UE may measure the signal quality on the different beams in any suitable way. For example, in an embodiment the downlink signal transmitted over a given beam comprises pilot symbols that are uniquely associated with that beam. Receiver 64 measures the signal quality on a given beam by estimating the achievable SNR using the pilot symbols of the beam. For example, the receiver may estimate the channel response between the eNodeB's and the UE using the pilot signals. Based on the estimated channel and the known beam steering vector (weight vector), the UE estimates the achievable SNR on that beam.

The eNodeB's 24 of system 20 receive the above-described feedback from the different UE's 28, and configure the transmission beams in various ways based on the feedback. The eNodeB's suitably decide, for example, over which beam or beams to transmit to each UE and at which times, which interfering beams to attenuate and at which times, the actual attenuation level to applied to each attenuated beam, which modulation and coding scheme to use in transmitting to a given UE, and/or any other relevant decision. When making these decisions, the eNodeB's may attempt to attain certain performance measures over each scheduling interval. Any performance criterion, such as maximum system throughput, proportional fairness among UE's or any other suitable criterion can be used for optimization.

In an embodiment, the eNodeB decisions are performed separately and independently at each cluster. In various embodiments, the eNodeB's of each cluster communicate with one another for sharing the feedback they receive and for coordinating the beam setting patterns and decisions. Alternatively, the decisions are made by a centralized processor (not shown in the figures) for the entire system 20. In these embodiments, the different eNodeB's typically communicate with the centralized processor for reporting the feedback they receive and for accepting configuration instructions. In an example embodiment, the centralized processor instructs the eNodeB's, for each beam, (1) whether the beam is to be transmitted or not, (2) the UE to which the beam is addressed (several beams can be addressed to the same UE), and (3) the modulation and coding scheme to be used in transmitting the beam.

In various embodiments, attenuation of a given beam is suitably performed in various ways. In some embodiments, the eNodeB's inhibit transmission of interfering beams altogether. In alternative embodiments, the eNodeB's reduce the transmission power of the beam below its normal intended level by a certain amount. In some embodiments, attenuation factors on the order of 10-dB are used. In alternative embodiments, smaller attenuation factors, e.g., between 3-6 dB, are suitable for enabling acceptable SNR on the preferred beams. Further alternatively, any other suitable attenuation factors can be used. In some embodiments, the eNodeB's select the actual level of attenuation to be applied to each attenuated beam.

In some embodiments, a beam that is being attenuated is still used for transmitting signals to other UE's. For example, a beam that is attenuated by 3-6 dB, or more, so as not to interfere with transmission to a first UE, is often sufficiently strong to be useful for signal transmission to a second UE. In some embodiments, the eNodeB's consider this effect when deciding on the desired attenuation factors of different transmission beams, so as to improve the overall system throughput.

In some embodiments, a given UE may refrain from reporting interfering beams to the eNodeB's. For example, in an embodiment the UE may choose not to report any interfering beam if the interference is relatively small. As another example, a UE may be requested by the eNodeB's not to report interfering beams (e.g., in a specific system configuration).

As noted above, eNodeB's 24 alternate the beam setting over time in accordance with a certain pattern. In some embodiments, the beam setting is modified relatively slowly. In some cases, modifying the beam setting at a rate that is slower than once per several TTIs (e.g., once per ten TTIs or slower) is considered slow. In other cases, modifying the beam setting at a rate that is slower than once per TTI is considered slow. In these embodiments, the system typically has sufficient time to complete a feedback cycle (i.e., measure signal quality and report feedback by the UE's, transmit downlink signals in response to the feedback by the eNodeB's, and receive the downlink signals by the UE's), all while the same beam setting is still valid.

In some embodiments, the pattern of beam settings is known in advance, so that a UE measure signal quality and report feedback on a given beam setting, which will occur again at a known future time. In other words, the UE can measure the interference inflicted by a certain beam on another beam in a current beam setting, and predict that this interference will also occur in a future occurrence of this beam setting. In an embodiment, the eNodeB's use this feedback for making scheduling decisions and attenuating beams at the future occurrence of this beam setting. This technique enables the system, for example, to compensate for the delays associated with the feedback process. A technique of this sort is suitably used when the beam settings change rapidly, e.g., every TTI, although it is also applicable for slowly-varying patterns.

Figure 3:
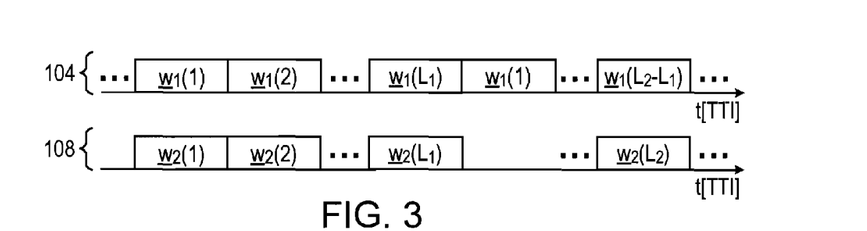
FIGS. 3 and 4 are graphs showing transmission protocols that use coordinated patterns of transmission beams, in accordance with embodiments of the present disclosure.

FIG. 3 is a graph showing a transmission protocol that uses a coordinated pattern of transmission beams, in accordance with an embodiment of the present disclosure. The present example refers to two eNodeB's, each transmitting a single beam. In the present example, the two eNodeB's change the beam setting every TTI. The first eNodeB applies a periodic pattern of beam settings having a period of $L_1$ TTIs. The weight vectors in this pattern are denoted $\underline{w}_1(1), \underline{w}_1(2), \ldots, \underline{w}_1(L_1)$. The second eNodeB applies a periodic pattern of beam settings having a period of $L_2$ TTIs. The weight vectors in this pattern are denoted $\underline{w}_2(1), \underline{w}_2(2), \ldots, \underline{w}_2(L_2)$. A graph 104 in FIG. 3 shows the first pattern of beam settings transmitted by the first eNodeB, and a graph 108 shows the second pattern of beam settings transmitted by the second eNodeB.

In each TTI, each eNodeB transmits pilot signals that enable the UE's to measure signal quality on the two beams and calculate the feedback, as explained above. Since the two patterns are periodic, any occurrence of a pair of $\{\underline{w}_1(i), \underline{w}_2(j)\}$ weight vectors will occur again at periodic intervals. Thus, in an embodiment, a given UE suitably measures signal quality and reports feedback to the eNodeB's on a certain occurrence of a certain weight vector. The eNodeB's apply the decisions taken with respect to this pair of weight vectors (e.g., scheduling or attenuating beams) in a future occurrence of this pair of weight vectors. Note, however, that the feedback typically remains valid for only a limited length of time, until the channel response changes considerably. In another embodiment, the UE can estimate the communication conditions in the $k^{th}$ TTI based on the signal measured at the $(k-L_1)^{th}$ and $(k-L_2)^{th}$ TTIs (and possibly other past measurements).

In the present embodiment, a given UE may be configured to report various kinds of feedback, such as the identity of the best-performing TTI out of the next five TTIs in the pattern, the identity of the beam that achieves the highest SNR, the achievable SNR in the best-performing TTI on the best-performing beam, and/or the achievable SNR at the best-performing TTI on the best-performing beam assuming the other beam is attenuated. In an embodiment, based on this feedback, the two eNodeB's cooperate to decide on the preferred scheduling policy. The policy suitably involves, for example, attenuating one of the two beams during one or more of the TTIs. If $L_1$ and $L_2$ have no common divisor, for example, the two eNodeB's select the scheduling policy over $L_1 \cdot L_2$ possible beam settings.

Figure 4:
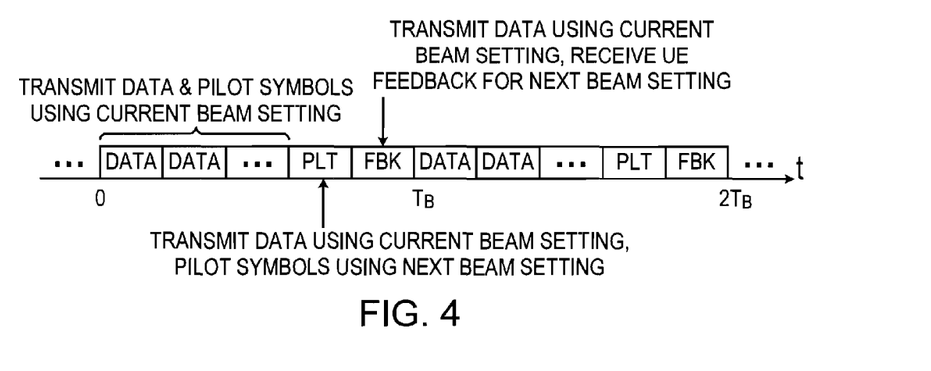

FIG. 4 is a graph showing a transmission protocol that uses a coordinated pattern of transmission beams, in accordance with an alternative embodiment of the present disclosure. In the present example, the system comprises three eNodeB's, referred to as $eNodeB_1$, $eNodeB_2$ and $eNodeB_3$. $eNodeB_1$ has two transmit antennas and transmits two beams. $eNodeB_2$ and $eNodeB_3$ have one transmit antennas each, and jointly transmit two beams. Thus, $B_1=B_2=\{1\}$, $B_3=B_4=\{2, 3\}$, and all weight vectors are of length 2.

In the example of FIG. 4, the eNodeB's change the beam settings (weight vectors) relatively slowly—every several TTIs. The time period during which the beam setting is kept constant is denoted $T_B$. In this configuration, the pattern of beam settings need not be periodic or even deterministic. For example, the pattern may be a pseudo-random pattern.

In the configuration of FIG. 4, during the first few TTIs of $T_B$ (marked "DATA" in the figure) the eNodeB's transmit both data and pilot symbols using the currently-valid beam setting. During a TTI marked "PLT", the eNodeB's continue to transmit data using the currently-valid beam setting, but switch to transmit pilot symbols using the beam setting of the next $T_B$ period. The pilot symbols used here suitably comprise dedicated pilot symbols. During this TTI, the UE's are configured to perform signal quality measurements that are applicable to the next $T_B$ period, while at the same time continuing to receive data using the currently-valid beam setting. The UE's typically measure the achievable SNR using each of the possible beams. In alternative embodiments, the pilots used in the "PLT" TTI suitably comprise common pilot symbols, assuming that all weight vectors are known to the UE.

During a TTI marked "FBK", the eNodeB's still continue to transmit data using the currently-valid beam setting, and at the same time receive the feedback from the UE's. This feedback that was calculated based on the measurements performed during the "PLT" TTI, and is therefore applicable to the next $T_B$ period. The eNodeB's apply this feedback (e.g., make scheduling decisions and attenuate beams) in time for the next $T_B$ period.

In the example of FIG. 4, the "FBK" TTI is the last TTI in the $T_B$ period, and "PLT" TTI precedes it. In alternative embodiments, the "PLT" and "FBK" TTIs are suitably positioned at any other suitable locations in the $T_B$ period, which allow sufficient time for calculating and transmitting the feedback, and for applying it in time for the next $T_B$ period.

In some embodiments, the feedback transmitted by the UE's in the "FBK" TTI comprises, for example, the identity of the two best-performing beams out of the four possible beams, the achievable SNR using each pair of selected beams, the best achievable SNR over the best-performing beam assuming one of the other three beams is attenuated, and/or the identity of a preferred beam to be attenuated.

After receiving this feedback from the UE's, the three eNodeB's cooperate to decide on the best scheduling scheme to be applied in the next $T_B$ period. In contrast to the example of FIG. 3 above, in which eNodeB cooperation was needed only for attenuation purposes, in the example of FIG. 4 eNodeB$_2$ and eNodeB$_3$ should perform the entire scheduling scheme together, since both eNodeB's transmit the same data over their two common beams. Note also that in the present example, several TTIs may be available for scheduling during the same $T_B$ period. Therefore, in the embodiment, the eNodeB's are configured to make several scheduling decisions using the same beam setting.

In some embodiments, the $T_B$ period is relatively long, so that changes in the communication channel during this period cannot be neglected. In these embodiments, the UE's calculate and send additional feedback during the $T_B$ period, so as to allow better scheduling decisions. Additionally or alternatively, prediction techniques are suitably utilized to compensate for the feedback delay.

In some embodiments, the scheme of FIG. 4 is combined with other types of feedback, or with other channel information available to the eNodeB's. Inasmuch as each eNodeB is free to choose its weight vectors, it can use the additional channel information to produce transmission beams that are more likely to be favorable by some UE's. In an embodiment, the choice of weight vectors is performed with little or no degradation in downlink performance.

In embodiments described above, the disclosed techniques are carried out by all eNodeB's 24 of system 20 and over the entire spectrum allocated to system 20. Generally, however, the disclosed techniques are not limited to this sort of implementation by all eNodeB's. In alternative embodiments, for example, the disclosed techniques are carried out using only part of the eNodeB's in system 20, and/or over only part of the spectrum allocated to the system.

It is thus noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
   at a mobile communication terminal, receiving from a group of two or more base stations multiple Radio Frequency (RF) transmission beams that alternate in time and space and comprise at least a first beam and a second beam;
   estimating in the terminal first and second signal qualities for the second beam, under respective first and second constraints, wherein the first constraint specifies that the first beam is active and the second constraint specifies that the first beam is inactive;
   identifying in the terminal that the first beam interferes with reception of the second beam based on the first and second signal qualities; and
   sending from the terminal to one or more of the base stations feedback indicating that the first beam interferes with the second beam,
   wherein identifying that the first transmission beam interferes with the reception comprises predicting interference for a future occurrence of the first and second transmission beams, and wherein sending the feedback comprises providing the feedback to the base stations for use in attenuating the first transmission beam during the future occurrence.

2. The method according to claim 1, wherein the first and second transmission beams alternate in time and space in accordance with a pattern that is coordinated among the base stations.

3. The method according to claim 1, wherein the first transmission beam is identified as causing the interference after identifying the second transmission beam as being preferable for receiving subsequent transmissions to the terminal.

4. The method according to claim 1, comprising identifying the second transmission beam as being preferable for receiving subsequent transmissions to the terminal, wherein sending the feedback comprises requesting to receive the subsequent transmissions over the second transmission beam.

5. The method according to claim 1, wherein estimating the signal qualities comprises receiving pilot signals on the at least some received transmission beams, and measuring the signal qualities over the pilot signals.

6. The method according to claim 1, and comprising selecting a preferred time interval for receiving the signals on the second transmission beam, wherein sending the feedback comprises causing the base stations to attenuate the first transmission beam during the preferred time interval.

7. The method according to claim 1, wherein receiving the transmission beams comprises receiving signals conforming to a Long Term Evolution (LTE) specification.

8. The method according to claim 1, wherein receiving the transmission beams comprises receiving at least one transmission beam that is transmitted jointly by two or more of the base stations.

9. The method according to claim 1, wherein sending the feedback comprises causing the base stations to transmit data to at least one other terminal over the first transmission beam.

10. The method according to claim 1, wherein identifying that the first transmission beam interferes with the reception comprises distinguishing, in a signal received by the terminal, between first and second pilot signals that are uniquely associated with the first and second transmission beams, and measuring the first and second pilot signals.

11. A communication apparatus, comprising:
    a receiver, which is configured to receive from a group of two or more base stations multiple Radio Frequency (RF) transmission beams that alternate in time and space and comprise at least a first beam and a second beam; and
    a processor, which is configured to estimate first and second signal qualities for the second beam, under respective first and second constraints, wherein the first constraint specifies that the first beam is active and the second constraint specifies that the first beam is inactive, to identify that the first beam interferes with reception of the second beam based on the first and second signal qualities, and to send to one or more of the base stations feedback indicating that the first beam interferes with the second beam,
    wherein the processor is configured to predict that the first beam interferes with the reception for a future occurrence of the first and second transmission beams, and to provide the feedback to the base stations for use in attenuating the first transmission beam during the future occurrence.

12. The apparatus according to claim 11, wherein the processor is configured to identify the second transmission beam as being preferable for receiving subsequent transmissions to the receiver, and to request the base stations to transmit the subsequent transmissions over the second transmission beam.

13. The apparatus according to claim 11, wherein the processor is configured to send the feedback so as to cause the base stations to transmit data to at least one other receiver over the first transmission beam.

14. A mobile communication terminal comprising the communication apparatus of claim 11.

15. A chipset for processing signals in a mobile communication terminal, comprising the communication apparatus of claim 11.

16. The apparatus according to claim 11, wherein the processor is configured to identify that the first transmission beam interferes with the reception by distinguishing, in a signal received by the terminal, between first and second pilot signals that are uniquely associated with the first and second transmission beams, and measuring the first and second pilot signals.

17. A method for communication, comprising:
transmitting to a mobile communication terminal from a group of two or more base stations multiple Radio Frequency (RF) transmission beams that alternate in time and space and comprise at least a first beam and a second beam;
receiving at the base stations from the terminal feedback indicating that the first beam interferes with the second beam, wherein the feedback is sent from the terminal upon identifying that the first beam interferes with reception of the second beam, by estimating in the terminal first and second signal qualities for the second beam under respective first and second constraints, wherein the first constraint specifies that the first beam is active and the second constraint specifies that the first beam is inactive; and
responsively to the feedback, attenuating the first transmission beam during transmission of the second transmission beam.

18. A communication system comprising two or more base stations, which are configured to transmit to a mobile communication terminal multiple Radio Frequency (RF) transmission beams that alternate in time and space and comprise at least a first beam and a second beam, to receive from the terminal feedback indicating that the first beam interferes with the second beam, wherein the feedback is sent from the terminal upon identifying that the first beam interferes with reception of the second beam, by estimating in the terminal first and second signal qualities for the second beam under respective first and second constraints, wherein the first constraint specifies that the first beam is active and the second constraint specifies that the first beam is inactive, and, responsively to the feedback, to attenuate the first transmission beam during transmission of the second transmission beam.

* * * * *